J. H. RANDOLPH, Jr.
Wheel Cultivators.
No. 138,931.            Patented May 13, 1873.
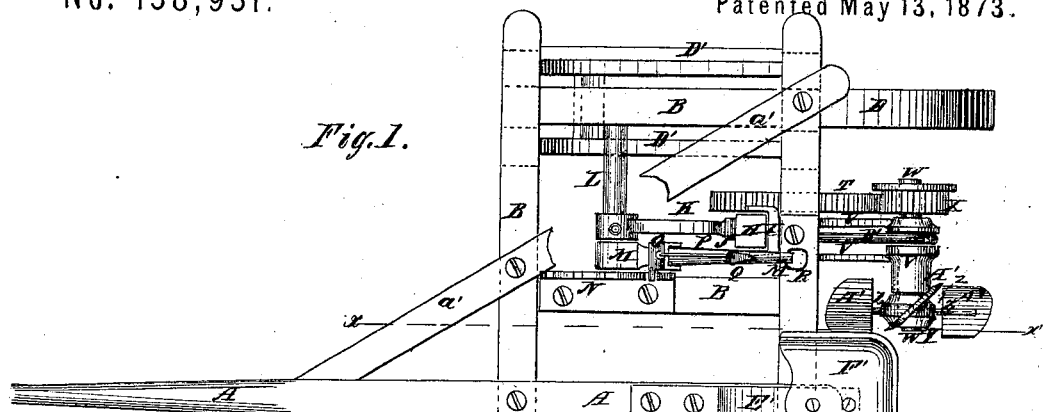
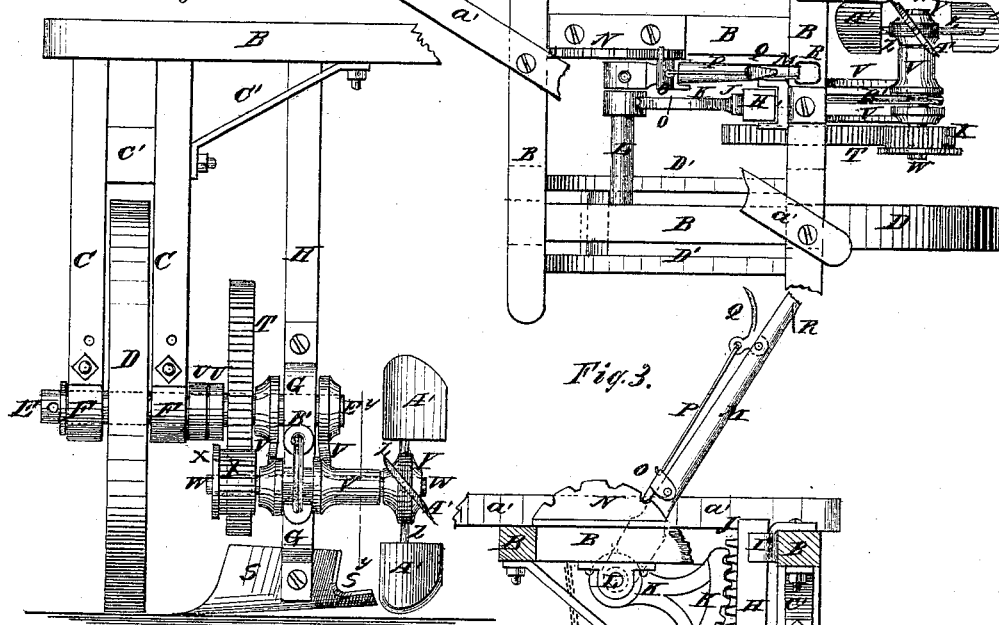
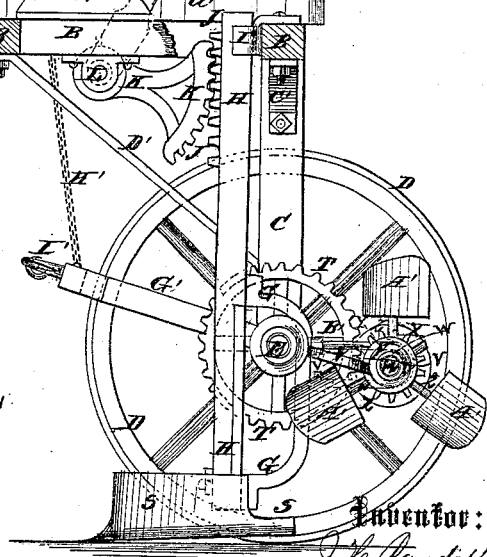
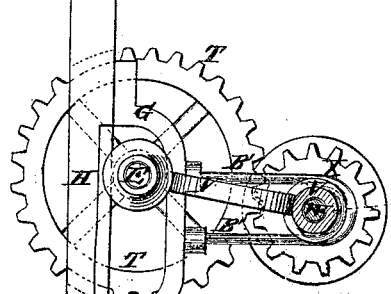

UNITED STATES PATENT OFFICE.

JOHN H. RANDOLPH, JR., OF BAYOU GOULA, LOUISIANA.

IMPROVEMENT IN WHEEL-CULTIVATORS.

Specification forming part of Letters Patent No. 138,931, dated May 13, 1873; application filed February 8, 1873.

*To all whom it may concern:*

Be it known that I, JOHN H. RANDOLPH, Jr., of Bayou Goula, in the county of Iberville and State of Louisiana, have invented a new and Improved Cultivator; and I do hereby declare that the following is a full, clear, and exact, description of the same, reference being had to the accompanying drawing forming a part of this specification, in which—

Figure 1 is a top view of my improved cultivator, parts being broken away to show the construction. Fig. 2 is a rear view of a portion of the same. Fig. 3 is a detail vertical section of the same, taken through the line $x\ x$, Fig. 1. Fig. 4 is a detail vertical section taken through the line $y\ y$, Fig. 2.

The invention consists in the improvement of cultivators as hereinafter described and pointed out in the claim.

A is the tongue of the machine attached to the centers of the cross-bars of the horizontal frame B, and strengthened by inclined braces $a'$. To the near cross-bar of the frame B (near each end) are attached the upper ends of a pair of vertical standards C, connected and held in position by a short cross-bar $c'$. The standards C of each pair are placed at such a distance apart as to receive one of the drive-wheels D between them. The drive-wheels D are placed upon shafts E, so that the said wheels D may carry the said shafts E with them in their revolution. The shafts E revolve in bearings F, while their inner ends project through keepers on long bearings G attached to the standard H, so that the latter may be raised and lowered without disturbing the shafts E. The upper parts of the standards H pass up through guides I. Upon the forward edge of the standards H are rack-teeth J, into which gear the teeth of the segmental toothed wheel K, the hubs of which are placed upon the shafts L. To the shafts L are rigidly attached the lower ends of the levers M. S are plows or scrapers which are attached to the lower ends of the standards H, and which are so formed as to move the soil inward or towards the plants. T are gear-wheels which are placed upon the shafts E, to which they are detachably secured by keys or other convenient means, so as to be carried around by and with the said shafts in their revolution, and which are kept in their proper relative position by tubular washers U, (two or more,) placed upon the said shaft E. V is a slotted bracket, the ends of which are pivoted to the shaft E upon the opposite sides of the standard H. In the outer part of the bracket V is formed a long bearing for the shaft W, which has a small gear-wheel, $x$, gearing with the wheel T. To the other end of the shaft W is attached a hub, Y, from which project three (more or less) radial arms Z, to the outer ends of which are attached blades or plates A' in an inclined position, so as to throw the soil toward the plants, said blades operating upon the soil somewhat as the blades of a propeller-screw operate upon the water. The blades A' may be used in connection with the plows S, or either may be used without the other. The bracket V passes through a loop or keeper, B', attached to the keeper G, so that as the standards H are raised, the loop B' may raise the outer part of the bracket V, and with it the blades A', for convenience in passing from place to place. This construction also enables the plows S and blades A' to be adjusted to work at any desired depth in the soil.

Having thus described my invention, what I claim as new, and desire to secure by Letters Patent, is—

1. The combination of the gear-wheels T X, shaft W, and bracket V, with the propeller or screw-blades Y Z A' and shaft E of the drive-wheel D, substantially as herein shown and described, and for the purpose set forth.

2. The combination of the keeper or long bearing G and loop B' with the adjustable standard H, shaft E of the drive-wheel D, and bracket V of the propeller-shaft W, substantially as herein shown and described, and for the purpose set forth.

JOHN HAMPDEN RANDOLPH, JR.

Witnesses:
G. M. CONRAD,
C. C. BIRD.